US011091886B2

(12) United States Patent
Fickeisen et al.

(10) Patent No.: US 11,091,886 B2
(45) Date of Patent: Aug. 17, 2021

(54) CONSTRUCTION MACHINE WITH A CONVEYOR BELT SYSTEM WITH WEIGHT SENSOR

(71) Applicant: JOSEPH VOEGELE AG, Ludwigshafen/Rhein (DE)

(72) Inventors: Steffen Fickeisen, Bad Duerkheim (DE); Arnold Rutz, Ludwigshafen (DE); Roman Munz, Neustadt (DE); Martin Buschmann, Neustadt (DE)

(73) Assignee: JOSEPH VOEGELE AG, Ludwigshafen/Rhein (DE)

( * ) Notice: Subject to any disclaimer, the term of this patent is extended or adjusted under 35 U.S.C. 154(b) by 39 days.

(21) Appl. No.: 16/510,176

(22) Filed: Jul. 12, 2019

(65) Prior Publication Data

US 2020/0018634 A1 Jan. 16, 2020

(30) Foreign Application Priority Data

Jul. 13, 2018 (EP) .................................... 18183360

(51) Int. Cl.
*E01C 19/00* (2006.01)
*E01C 19/48* (2006.01)
(Continued)

(52) U.S. Cl.
CPC ............ *E01C 19/48* (2013.01); *G01G 11/003* (2013.01); *G01G 11/04* (2013.01); *G01G 11/12* (2013.01);
(Continued)

(58) Field of Classification Search
CPC ... E01C 19/48; E01C 2301/02; G01G 11/003; G01G 11/04; G01G 11/12; G05D 2201/0202
(Continued)

(56) References Cited

U.S. PATENT DOCUMENTS 3,749,505 A    7/1973  Miller et al.
5,044,819 A *  9/1991  Kilheffer ................ E01C 19/46
                                                        404/72

(Continued)

FOREIGN PATENT DOCUMENTS

CN    1141986 A    2/1997
CN    1158374 A    9/1997
(Continued)

OTHER PUBLICATIONS

Extended European Search Report dated Jun. 13, 2019, Application No. 18183360.9-1002, Applicant Joseph Voegele AG, 13 Pages.
(Continued)

*Primary Examiner* — Raymond W Addie
(74) *Attorney, Agent, or Firm* — Brooks Kushman P.C.

(57) ABSTRACT

A construction machine, which is a feeder vehicle or a road finisher, comprises an operating platform, a material hopper, a conveyor belt system and an electronic control system. The conveyor belt system comprises a conveyor belt and one or more weight sensors which are configured to measure weight force of paving material located on the conveyor belt. In addition, the conveyor belt system comprises one or more inclination sensors which are configured to measure an inclination angle and/or a roll angle of the conveyor belt system. The electronic control system is configured to receive and process data from the one or more weight sensors and the one or more inclination sensors to calculate a mass of the paving material.

20 Claims, 2 Drawing Sheets

(51) Int. Cl.
*G01G 11/00* (2006.01)
*G01G 11/04* (2006.01)
*G01G 11/12* (2006.01)

(52) U.S. Cl.
CPC .. *E01C 2301/02* (2013.01); *G05D 2201/0202* (2013.01)

(58) Field of Classification Search
USPC ................................ 404/72, 75, 85–92, 118
See application file for complete search history.

(56) References Cited

U.S. PATENT DOCUMENTS

| | | | |
|---|---|---|---|
| 5,735,634 | A | 4/1998 | Ulrich et al. |
| 5,846,022 | A | 12/1998 | Grundl |
| 7,172,363 | B2 | 2/2007 | Olson et al. |
| 7,458,747 | B2 * | 12/2008 | Musil .................... E01C 19/185 404/101 |
| 7,488,138 | B2 | 2/2009 | Buschmann |
| 7,572,081 | B2 | 8/2009 | Bushmann |
| 8,388,070 | B2 | 3/2013 | Von Schoenebeck et al. |
| 8,454,266 | B2 | 6/2013 | Buschmann et al. |
| 9,011,038 | B2 | 4/2015 | Buschmann et al. |
| 9,028,167 | B2 | 5/2015 | Buschmann et al. |
| 9,260,827 | B2 | 2/2016 | Bertz et al. |
| 9,540,778 | B2 | 1/2017 | Rutz et al. |
| 9,879,386 | B2 * | 1/2018 | Marsolek ................ E01C 19/48 |
| 2006/0088379 | A1 * | 4/2006 | Lazic .................... E01C 19/475 404/75 |
| 2010/0296867 | A1 | 11/2010 | Buschmann et al. |
| 2012/0263530 | A1 * | 10/2012 | Buschmann ............ E01C 19/00 404/72 |
| 2013/0087434 | A1 | 4/2013 | Fickeisen et al. |
| 2014/0046488 | A1 | 2/2014 | Eul et al. |
| 2016/0215458 | A1 | 7/2016 | Weiler et al. |
| 2017/0205999 | A1 | 7/2017 | Marsolek |
| 2020/0262428 | A1 * | 8/2020 | Fritz .................... G05D 1/0259 |

FOREIGN PATENT DOCUMENTS

| | | | |
|---|---|---|---|
| CN | 101050621 | A | 10/2007 |
| CN | 101054788 | A | 10/2007 |
| CN | 101839135 | A | 9/2010 |
| DE | 199 51 646 | A1 | 5/2001 |
| DE | 10 2005 040 326 | A1 | 4/2006 |
| DE | 10 2012 209 495 | A1 | 12/2012 |
| EP | 2 514 873 | A1 | 7/1996 |
| EP | 2 711 460 | A1 | 2/1998 |
| EP | 2 514 873 | A1 | 10/2012 |
| EP | 2 711 460 | A1 | 3/2014 |
| JP | H0492008 | U | 8/1992 |
| JP | H0710011 | U | 2/1995 |
| JP | H09184106 | A | 7/1997 |
| JP | 2002061110 | A | 2/2002 |
| JP | 2003232008 | A | 8/2003 |
| JP | 2011196174 | A | 10/2011 |
| JP | 2013079944 | A | 5/2013 |
| JP | 2013528542 | A | 7/2013 |
| JP | 2013155597 | A | 8/2013 |
| JP | 2014037768 | A | 2/2014 |
| JP | 2014062450 | A | 4/2014 |
| JP | 2014206044 | A | 10/2014 |
| SU | 972241 | * | 11/1982 ............. G01G 11/16 |

OTHER PUBLICATIONS

European Search Report dated Jan. 28, 2019, Application No. 18183360.9-1002, Applicant Joseph Voegele AG, 8 Pages.

Japanese Office Action dated Sep. 8, 2020 (with English Machine Translation) Application No. 2019-113917, 19 Pages.

Japanese Office Action Application No. 2019-113917 dated Sep. 8, 2020, English Machine Translation (Notification of Reasons(s) for Refusal).

Extened European Search Report dated Jun. 13, 2019 Application No. 18183360.9, Letter identifiers that indicate relevance of the cited documents.

European Search Report dated Jan. 28, 2019 Application No. 18183360.9, Letter identifiers that indicate relevance of the cited documents.

Chinese Office Action & Search Report dated Jan. 21, 2021 (with English Translation), Application No. 201910619644.1,21 Pages.

Chinese Office Action & Search Report Application No. 201910619644.1 dated Jan. 21, 2012, English Translation (First Office Action & Search Report).

* cited by examiner

CONSTRUCTION MACHINE WITH A CONVEYOR BELT SYSTEM WITH WEIGHT SENSOR

CROSS-REFERENCE TO RELATED APPLICATIONS

This application claims foreign priority benefits under 35 U.S.C. § 119(a)-(d) to European patent application number EP 18183360.9, filed Jul. 13, 2018, which is incorporated by reference in its entirety.

TECHNICAL FIELD

The present disclosure refers to a construction machine which may be a road finisher or a feeder vehicle.

BACKGROUND

Road finishers are used to build roads or similar surfaces by applying a pavement of asphalt or a similar material. The road finisher holds the paving material in a material hopper, the paving material being successively deposited in front of the paving screed by using a conveyor belt system and being pre-compacted and smoothed by the screed to create an even and homogeneous surface. A feeder vehicle can be used in the direction of travel in front of the road finisher, in particular to increase the material stocking. The feeder vehicle is independently driven and also includes a material hopper and a conveyor belt system. When a feeder vehicle is used, the paving material delivered by a truck is first dumped into the material hopper thereof and transported via the conveyor belt system of the feeder vehicle into the material hopper of the road finisher. This provides two material hoppers for material stocking. This allows a larger time buffer for the delivery of the paving material. Both construction machines can be equipped with additional devices, in particular arranged in their respective material hoppers, such as a heater, augers or vibrators, which improve the paving process by ensuring good mixing of the paving material and preventing the paving material from cooling, solidifying or segregating.

The disadvantage of existing construction machinery, especially in the form of road finishers and feeder vehicles, is that the quantities of material conveyed can only be estimated and that a sufficient supply and stocking with paving material can only be checked by visual inspection.

SUMMARY

It is an object of the disclosure to precisely and continuously quantify and monitor the processing of paving material by a construction machine, which is a road finisher or a feeder vehicle.

A construction machine according to the disclosure, which is a road finisher or a feeder vehicle, comprises an operating platform, a material hopper, a conveyor belt system and an electronic control system. The conveyor belt system comprises a conveyor belt and one or more weight sensors which are configured to measure the weight force of the paving material located on the conveyor belt. The conveyor belt system further comprises one or more inclination sensors configured to measure an inclination angle and/or a roll angle of the conveyor belt system. The electronic control system is configured to receive and process data from the weight sensors and inclination sensors to calculate a mass of the paving material. In addition to or as an alternative to the weight sensor, the conveyor belt system may include a volume sensor configured to measure a volume of the paving material located on the conveyor belt.

In both road finishers and feeder vehicles, the material hopper is usually arranged at the front in the direction of travel so that it can be filled by a preceding vehicle. The conveyor belt system runs through a chassis tunnel from the material hopper to the rear end of the construction machine, where, for example, the paving material is deposited in front of a paving screed. The conveyor belt rests on bearings, such as rollers, and can be operated at variable conveying speeds. The weight sensors can be arranged on individual bearings and thus measure the weight force of the paving material on individual areas or cells. It is also possible to equip the conveyor belt bearings with weight sensors in such a way that the weight force of all the paving material located on the conveyor belt is measured. The measurement results are here corrected by the dead weight of the conveyor belt. If the construction machine is located on an inclined surface for asphalting said surface, the construction machine and thus the conveyor belt are also inclined accordingly, and the normal force exerted by the paving material on the weight sensor deviates from the actual weight force. The same applies in the event that the inclination of the conveyor belt itself can be changed, as is possible in particular with feeder vehicles, in order to lift the paving material over the side walls of a material hopper of a road finisher to be loaded and discharge it over the material hopper. With the aid of one or more inclination sensors, an inclination angle and a roll angle of the conveyor belt system can be determined and the weight force can be corrected using known trigonometric functions in order to determine the actual mass of the paving material on the conveyor belt. Preferably, the electronic control system automatically processes all the data received from the sensors in real time and can show them to the operator of the construction machine on a display. This makes it possible to continuously monitor the mass or quantity of the processed paving material and it is no longer necessary to estimate the quantity already processed or the still remaining quantity only on the basis of the delivery note of a delivering truck and a visual inspection of the material in the material bunker.

The volume sensor can, for example, be a laser scanner which is mounted above the conveyor belt and optically scans the surface of the paving material on the conveyor belt. For example, the surface profile can be scanned two-dimensionally along an imaginary cutting line perpendicular to the conveying direction and running horizontally, but a wider area on the conveyor belt can also be covered three-dimensionally. Volume-based data can also be calculated in this way.

The conveyor belt system expediently comprises one or more speed sensors configured to measure a conveying speed of the conveyor belt. The speed sensors can, for example, measure the rotational movement of a roller drive of the conveyor belt. With the recorded speed values of the conveyor belt, the actually processed quantity of paving material can be calculated, since the time for which the paving material remains on the conveyor belt is thus known. The conveyor belt drive can also be controlled in this way.

In a typical variant, the electronic control system is configured to receive and process data of the speed sensors to calculate a conveying rate of the paving material. Since the previously mentioned measurement values for mass and volume represent only a single point in time, the combination of the individual measurement values with the conveying speed is able to calculate the temporal course and thus also the sum of the material conveyed up to a certain point in time. By taking the conveying speed into account, the measurement values can be summed up or integrated, and multiple counting is avoided.

Ideally, the electronic control system is configured to determine a buffer quantity of the paving material of the construction machine on the basis of the data received from the sensors, thereby pre-calculating the availability of the paving material in terms of time. For example, it can be assumed that the paving requirements will remain the same and that the previous delivery rate determined can be interpolated appropriately. From the delivery note for the delivered paving material, its original quantity is known and thus the remaining quantity in the material hopper, and the remaining time up to the required refilling can be calculated. This means that the delivery of paving material can be organized efficiently so that there is neither too little material available and the paving process therefore has to be interrupted, nor is too much paving material delivered and the transport trucks have to put up with waiting times until unloading during which the paving material may cool down. The paving speed can also be adjusted within limits if this is required by the supply chain.

In a common variant, the electronic control system has an interface for wireless data communication for exchanging data with electronic control systems of other construction machines and/or with other data processing systems. This allows an integrative control concept for a construction site to be implemented using conventional radio standards and devices, in which concept all the vehicles involved are connected to each other via a comprehensive data exchange and a corresponding process planning and coordination can take place.

Preferably, a construction machine, especially a road finisher, comprises a paving screed with screed width detection in order to determine a width of a laid road surface. This screed width detection may be readable data fields, such as ID tags, of a fixed-width paving screed and/or of attachments, or a measuring device, such as a potentiometer, in the case of extensible screeds. The data are each stored and processed by the electronic control system.

Typically, the construction machine is equipped with a distance sensor to determine a distance traveled in a paving operation and thus a length of a laid road surface. The distance sensor can be a mechanical device, such as a measuring wheel attached to a bracket, which is rotated by ground contact when the construction machine moves, and this rotation is in turn detected electronically, for example by reading Hall sensors which detect the rotation of a magnet. In the same way, however, the motion can also be detected using other mechanical or electronic methods, such as satellite-supported position determination, e.g., GPS. Thus, the exact length of the newly finished road surface can be detected and processed by the electronic control system.

In another advantageous variant, a road finisher comprises a paving screed with layer thickness detection to determine a layer thickness of a laid road surface. The layer thickness can, for example, be determined by a comparative measurement of the height of the newly paved road surface and the height of the road foundation in front of it. This can be done by using extensible tactile sensors, or laser devices or other suitable methods, wherein the sensors can be arranged on the paving screed but also on other expedient positions of the construction machine. In this way, not only the relative height of the road surface compared to other reference points such as a sidewalk edge can be determined, but also the absolute layer thickness.

In a preferred variant, the electronic control system is configured to calculate a mass per area on the basis of the determined mass of the processed paving material and the width and length of the laid road surface. Usually, a minimum mass per area of the paving material is already predetermined when the order is placed in order to obtain a certain durability and resistance of the road surface. The value must not be lower than this, as otherwise the new road surface would have to be removed and a new one would have to be installed once again. However, the value should also not be too high, as this would otherwise result in additional costs for the contractor. With the sensors described above it is already possible during the paving operation to check whether all requirements have been met and, if necessary, the machine settings can be corrected immediately. In addition, as already mentioned, material throughput can be monitored and efficient site management can be carried out.

In a conventional variant, the electronic control system is configured to calculate a mass per volume and thus a degree of compaction of the paving material on the basis of the determined mass of the processed paving material and the width, length and layer thickness of the laid road surface. The degree of compaction indicates the extent to which further compaction by rollers is required.

Typically, the electronic control system is configured to calculate a further demand for paving material on the basis of the determined mass per area of the laid road surface and of known dimensions of an area still to be asphalted. For example, the entire surface to be asphalted can be entered for this purpose into the electronic control system before paving begins, so that the electronic control system can then calculate the further demand for paving material on the basis of the current position data determined and of the previous material consumption. In this way, the further delivery by trucks can be planned and a corresponding production capacity can be maintained, but also an excess quantity of delivered paving material can be avoided.

In a common variant, the conveyor belt system of the construction machine, which can in particular be a feeder vehicle, is a pivoting belt system which is suitable for taking up various pivoting positions in order to transfer paving material to different construction machines, in particular road finishers, which are subsequent in the production chain. For example, two pavers asphalting side by side can be loaded by one feeder vehicle. In this way, the demand for construction machinery and thus the costs for a construction site can be reduced.

Preferably, the pivoting belt system comprises an angle sensor to detect the pivoting position of the pivoting belt system and to assign different angle ranges to different subsequent construction machines, in particular road finishers. At the beginning of the work process, the respective position of the pivoting belt system can be assigned to a road finisher, i.e. the system can be taught. Then, for example, a feeder vehicle can load two road finishers and an electronic control system automatically registers which road finisher has received how much and which paving material. This makes it possible to automatically monitor and control the paving process and to determine data as described above, which means a more efficient paving process.

In a further variant, the construction machine comprises a wireless near-field communication unit to identify the subsequent construction machine, in particular a road finisher, to which the paving material is to be handed over, by reading out an unambiguous identification. For example, a reader can be arranged on the pivoting belt system for reading out an RFID chip attached to the road finisher to be loaded when the pivoting belt system is pivoted towards this road finisher. This means that the teach-in process for identifying the respective road finisher at a specific pivoting position can also take place fully automatically in conjunction with the electronic control system.

In a further expedient variant, the electronic control system and/or the interface for wireless data communication is configured to identify a subsequent construction machine, in particular a road finisher, to which the paving material is handed over, in the data stream. For example, if a feeder vehicle loads several road finishers, data and signals can respectively be exchanged between the feeder vehicle and the currently relevant road finisher.

In the following, embodiments of the disclosure are described in more detail with reference to the drawings.

Components corresponding to each other are each provided with the same reference signs in the figures.

DETAILED DESCRIPTION

Figure 1:
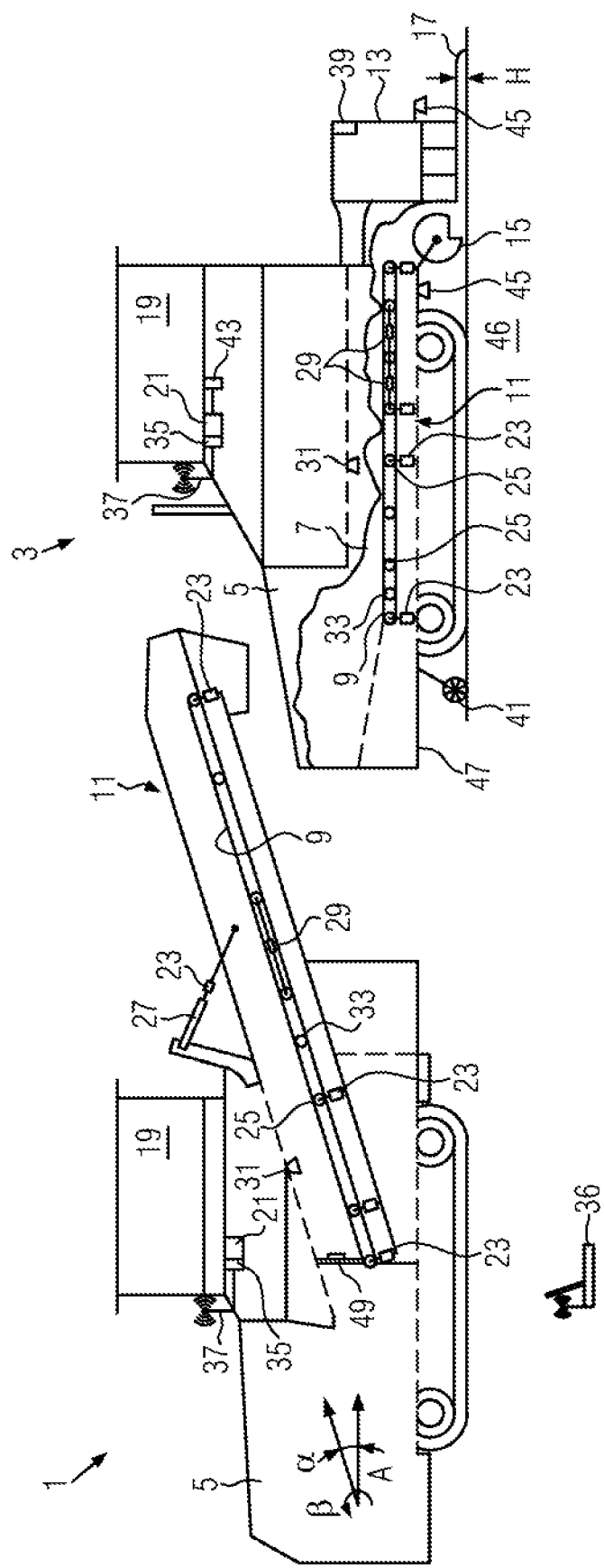
FIG. 1 shows two construction machines in the form of a feeder vehicle and a road finisher in a schematic lateral view.

FIG. 1 shows embodiments of a construction machine 1, 3 according to the disclosure in the form of a feeder vehicle 1 and a road finisher 3. The feeder vehicle 1 comprises a material hopper 5 into which paving material 7 can be dumped from a truck and in which it is stocked and, if necessary, heated and mixed. The paving material 7 is loaded into the material hopper 5 of the road finisher 3 via a conveyor belt 9 of a conveyor belt system 11. From there it is placed in front of a paving screed 13 using the conveyor belt system 11 of the road finisher 3 and is distributed evenly by an auger 15. The paving screed 13 smooths and compacts the paving material 7, resulting in an even and stable road surface 17. Both construction machines 1 and 3 have an operating platform 19, from which a driver can respectively operate the construction machine 1 and 3. An electronic control system 21 comprises data processing and data storing components and controls the operation of the respective construction machine 1, 3 in accordance with the implemented functions, including data exchange with sensors and input and output devices.

The conveyor belt system 11 respectively comprises one or more weight sensors 23, which measure the weight force of the paving material 7 located on the conveyor belt 9. The weight sensors 23 can either be arranged in such a way that they only measure a section of the conveyor belt 9, or they can also detect the weight force of all the paving material 7 located on the conveyor belt 9. Accordingly, the weight sensors 23 can be arranged in the bearing of individual support rollers 25 or in the bearing of the entire conveyor belt 9. In the case of the feeder vehicle 1, weight measurement is also possible by a weight sensor 23 arranged in a suspension 27 of the pivotable conveyor belt system 11.

To determine the position of the conveyor belt system 11 in space, one or more inclination sensors 29 are installed, which determine an inclination angle $\alpha$ and a roll angle $\beta$. The inclination angle $\alpha$ indicates the inclination of the conveyor belt system 11 to the horizontal, wherein the inclination occurs due to an adjustment of the conveyor belt system 11 and due to driving on an uphill or downhill road and thus an additional inclination of a horizontal vehicle axis A. The roll angle $\beta$ corresponds to a rotation of the construction machine 1, 3 about the horizontal vehicle longitudinal axis A due to a laterally descending surface profile of the road foundation, which is to be maintained, for example, for the purpose of a curve elevation. With the angle data received from the inclination sensor 29, the normal force detected by the weight sensor 23 and acting on the conveyor belt 9 can then be converted into the actual weight force of the paving material 7 and its mass can thus be determined.

A volume sensor 31 can be arranged inside the conveyor belt system 11, which, as described above, senses the volume of the paving material 7 located on the conveyor belt 9, for example, by laser measurement. Furthermore, a speed sensor 33 is arranged in the conveyor belt system 11, which speed sensor 33 measures the conveying speed of the conveyor belt 9. Such a speed sensor 33 can be connected to the conveyor belt 9 as an extra component, for example as a roller driven by the conveyor belt 9, or, if the conveyor belt 9 is driven by an electric motor, it can also be installed directly therein.

In addition to the data lines, memory units and circuits for data exchange with the electronic components of the construction machine, the electronic control system 21 is also equipped for data storage and processing with an interface 35 for wireless data communication with other construction machines 1 and/or further data processing systems 36, such as a portable personal computer or a control center of the executing construction company. The interface 35 can therefore be, for example, a mobile radio, WLAN or Bluetooth interface 35 or an interface for another suitable transmission standard, wherein several of these may also be implemented. The interface 35 for data communication can be expediently connected to a suitable antenna 37.

The construction machine 3 in the form of a road finisher 3 comprises the paving screed 13, the width of which can be adapted to the respective requirements by using attachable widening elements or an extension mechanism. A screed width detector 39 is arranged on the paving screed to measure its working width. This detector can, for example, read out identification tags, which contain relevant information, from fixed-width screeds and attachments or measure the extension width of extension screeds using a potentiometer, for example. The determined data are then forwarded to the electronic control system 21.

In order to determine the distance traveled in the paving operation, the construction machine 3 can comprise a distance sensor in the form of a measuring wheel 41. In addition or alternatively, a GPS receiver 43 can also be used. Both distance sensors 41, 43 are read out by the electronic control system 21 and can optionally be coupled with a monitoring of the paving screed 13, so that only the distance traveled where the paving screed 13 is in a lowered production position or floating position and thus in the paving operation is automatically recorded.

To determine a layer thickness H of the laid road surface 17, a layer thickness detector 45 is arranged on the road finisher 3, which is shown here in the form of two laser distance measuring devices 45. It is used to measure the surfaces of a road foundation 46 before paving the road surface 17 and the laid road surface 17 and to determine their difference in height. The distance measuring devices 45 can both be mounted on the chassis of the road finisher 3 or both on the paving screed 13 with an appropriate linkage. Alternatively, these additional measuring devices 45 can be dispensed with and the position of the paving screed 13 in comparison to a chassis 47 can be detected via its suspension. Height adjustment of the chassis 47 can also be taken into account.

The conveyor belt system 11 of the feeder vehicle 1 may be a pivoting belt system, so that several road finishers 3 can be loaded in different positions in relation to the feeder vehicle 1 by horizontal pivoting of the conveyor belt system 11. To detect the current position of the pivoting belt system 11, it can be equipped with an angle sensor 49 to sense a rotary or pivoting angle.

Figure 2:
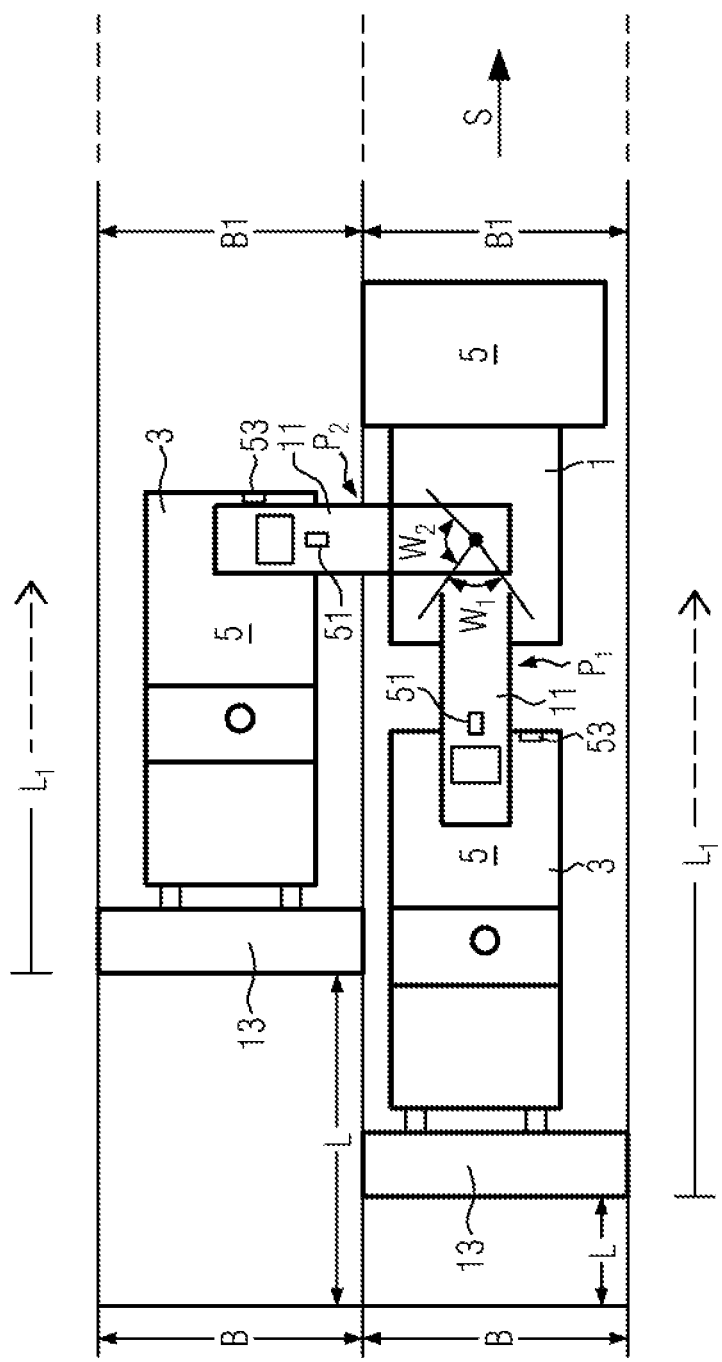
FIG. 2 shows two road finishers and a feeder vehicle with a pivoting belt system in a first and second position in a schematic plan view.

FIG. 2 shows a paving train with two road finishers 3 travelling staggered next to each other and a feeder vehicle 1, which comprises a conveyor belt system 11 in the form of a pivoting belt system, which is shown in a first position P1 for loading a road finisher 3 travelling behind the feeder vehicle 1, viewed in the direction of travel S, and a second position P2 for loading a laterally staggered road finisher 3. In order to link the position of the conveyor belt system 11, which is detected by the angle sensor 49, with a respective road finisher 3, a unit 51 for wireless near-field communication can be arranged on the feeder vehicle 1, for example on the conveyor belt system 11, in particular on its underside, which unit reads out an identification 53 of the respective road finisher 3 in order to identify it in an unambiguous manner. The identification can, for example, be an RFID label attached to the material hopper 5 of the road finisher 3. Since the conveyor belt system 11 can not only be adjusted between two positions P1, P2, but can also be pivoted continuously, not only an exact position P1, P2 of the conveyor belt system can be assigned to a road finisher 3, but angle ranges W1, W2 can also be defined and assigned, e.g., in a size of 80 each.

The road surface 17 already laid has a width B and a length L, which can be determined as described above. The dimensions of a surface still to be asphalted can be determined by a length L1 and a width B1. However, more complicated shapes can also be produced. To determine the total demand for paving material 7, the total area can be measured in the planning process accordingly.

Based on the embodiments of a construction machine 1, 3 shown above, many variations of the same are conceivable. For example, a feeder vehicle 1 can be equipped with a first and a second conveyor belt system 11. The first conveyor belt system 11 serves to transport the paving material 7 from the material hopper 5 to the rear end of the feeder vehicle 1, where it is transferred to the second conveyor belt system 11, and a road finisher 3 is loaded by it. The second conveyor belt system 11 is usually a pivoting belt system. The weight sensor 23 as well as the further sensors 23, 31, 33 can be installed in each of the conveyor belt systems 11, the internal conveyor belt system 11 being recommended for the sake of simplicity.

What is claimed is:

1. A construction machine comprising:
   an operating platform;
   a material hopper;
   a conveyor belt system including a conveyor belt and one or more weight sensors which are configured to measure weight force of paving material located on the conveyor belt, and one or more inclination sensors which are configured to measure an inclination angle and a roll angle of the conveyor belt system; and
   an electronic control system;
   wherein the electronic control system is configured to receive and process data from the one or more weight sensors and the one or more inclination sensors to calculate a mass of the paving material, and/or the conveyor belt system includes a volume sensor configured to measure a volume of the paving material located on the conveyor belt.

2. The construction machine according to claim 1, wherein the electronic control system has an interface for wireless data communication for exchanging data with electronic control systems of other construction machines and/or with further data processing systems.

3. The construction machine according to claim 1 further comprising a distance sensor in order to determine a distance travelled in a paving operation and thus a length of a laid road surface.

4. The construction machine according to claim 1, wherein the inclination angle indicates inclination of the conveyor belt system relative to a longitudinally extending axis, and the roll angle corresponds to a rotation of the conveyor belt system about the axis.

5. The construction machine according to claim 1, wherein the electronic control system is configured to receive and process data from the one or more weight sensors and the one or more inclination sensors to calculate the mass of the paving material, and the conveyor belt system includes the volume sensor configured to measure the volume of the paving material located on the conveyor belt.

6. The construction machine according to claim 1, wherein the conveyor belt system comprises one or more speed sensors configured to measure a conveying speed of the conveyor belt.

7. The construction machine according to claim 6, wherein the electronic control system is configured to receive and process data of the one or more speed sensors to calculate a conveying rate of the paving material.

8. The construction machine according to claim 7, wherein the electronic control system is configured to determine, based on the data received from the sensors and a known original quantity of the paving material delivered to the hopper of the construction machine, a buffer quantity of the paving material of the construction machine and thus to pre-calculate availability of the paving material in terms of time.

9. The construction machine according to claim 1, wherein the construction machine is formed as a road finisher and comprises a paving screed with a screed detector for determining a width of a laid road surface.

10. The construction machine according to claim 9, wherein the screed detector is configured to read an identification tag from a screed attachment.

11. The construction machine according to claim 9, wherein the screed detector is configured to measure an extension width of an extension screed.

12. The construction machine according to claim 1, wherein the construction machine is formed as a road finisher and comprises a paving screed with a layer thickness detector for determining a layer thickness of a laid road surface.

13. The construction machine according to claim 12, wherein the electronic control system is configured to calculate, based on the determined mass of the paving material and a width, a length and the layer thickness of the laid road surface, a mass per volume and thus a degree of compaction of the paving material.

14. The construction machine according to claim 12, wherein the layer thickness detector comprises a first distance measuring device to measure a surface of a road foundation before paving the road surface on the road foundation, and a second distance measuring device to measure a surface of the laid road surface.

15. The construction machine according to claim 12, wherein the electronic control system is configured to calculate a mass per area based on the determined mass of the paving material and a width and length of the laid road surface.

16. The construction machine according to claim 15, wherein the electronic control system is configured to calculate a demand for paving material based on the calculated mass per area of the laid road surface and known dimensions of an area still to be asphalted.

17. The construction machine according to claim 1, wherein the construction machine is formed as a feeder vehicle, and wherein the conveyor belt system is a pivotable belt system which is suitable for taking up different pivot positions in order to transfer paving material to different construction machines that are subsequent in a production chain.

18. The construction machine according to claim 17, wherein the pivotable belt system comprises an angle sensor in order to detect the pivot position of the pivotable belt system and to assign different angle ranges different subsequent construction machines.

19. The construction machine according to claim 17 further comprising a wireless near-field communication unit in order to identify a subsequent construction machine to which the paving material is to be handed over, by reading out an unambiguous identification.

20. The construction machine according to claim 17, wherein the electronic control system is configured to identify a subsequent construction machine to which the paving material is handed over, in a data stream.

* * * * *